United States Patent
Denisart

(10) Patent No.: US 6,763,759 B2
(45) Date of Patent: Jul. 20, 2004

(54) DEVICE FOR INJECTING WATER INTO AN APPARATUS FOR PREPARING A BEVERAGE FROM A CAPSULE

(75) Inventor: Jean-Paul Denisart, La Conversion (CH)

(73) Assignee: Monodor S.A., St. Barthelemy (CH)

( * ) Notice: Subject to any disclaimer, the term of this patent is extended or adjusted under 35 U.S.C. 154(b) by 0 days.

(21) Appl. No.: 10/470,090

(22) PCT Filed: Jan. 24, 2002

(86) PCT No.: PCT/IB02/00206
§ 371 (c)(1),
(2), (4) Date: Jul. 24, 2003

(87) PCT Pub. No.: WO02/058523
PCT Pub. Date: Aug. 1, 2002

(65) Prior Publication Data
US 2004/0079237 A1 Apr. 29, 2004

(51) Int. Cl.[7] .............................................. A47J 31/00
(52) U.S. Cl. ...................... 99/302 P; 99/295; 99/302 R
(58) Field of Search ........................... 99/302 R, 302 P, 99/295, 280, 282, 283, 300

(56) References Cited

U.S. PATENT DOCUMENTS

| | | |
|---|---|---|
| 3,269,298 A | 8/1966 | Grundmann |
| 3,295,998 A | 1/1967 | Goros |
| 3,327,614 A | 6/1967 | Bridges |
| 3,604,335 A | 9/1971 | Lafitte |
| 4,389,925 A | 6/1983 | Piana |
| 5,911,810 A * | 6/1999 | Kawabata ................. 99/302 P |
| 6,510,783 B1 * | 1/2003 | Basile et al. .............. 99/289 R |

FOREIGN PATENT DOCUMENTS

EP 0784955 A 7/1997

* cited by examiner

Primary Examiner—Reginald L. Alexander
(74) Attorney, Agent, or Firm—Clifford W. Browning; Woodard, Emhardt, Moriarty, McNett & Henry LLP

(57) ABSTRACT

The invention concerns an apparatus for preparing a beverage from a capsule containing the product to be extracted comprising a water injecting device (3) including an injection head (18) connected to a water supply conduit (9), and a hydraulic system for displacing the injection head towards a capsule-holder (4) positioned beneath the injection head, the hydraulic system being connected to a piston water conduit (11) interconnected via a locking control valve (12) to a pump (2), which also feeds the injection head.

10 Claims, 6 Drawing Sheets

Standby Position

Beginning of a cycle

Shower discharge

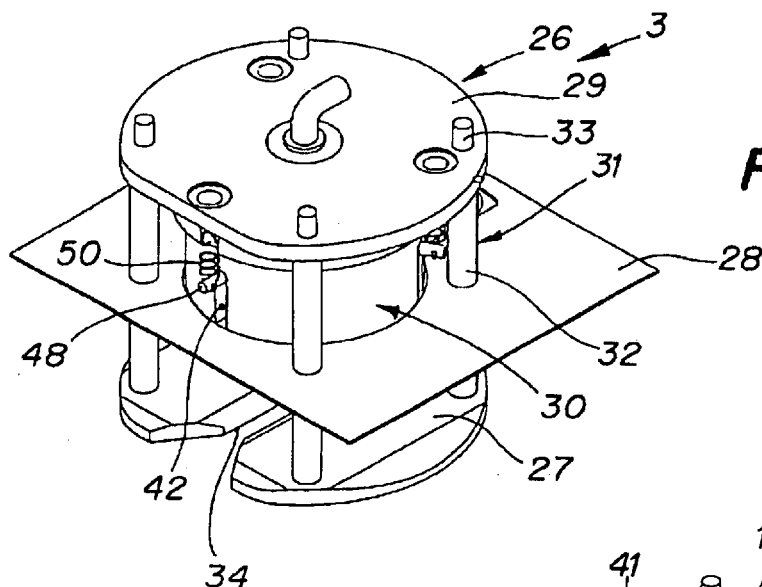
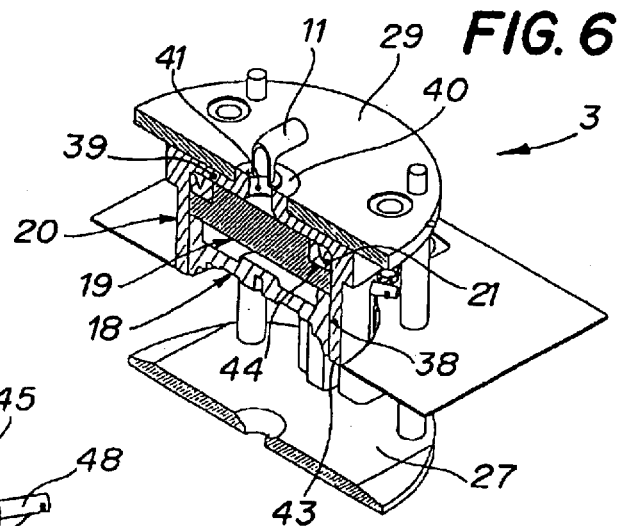
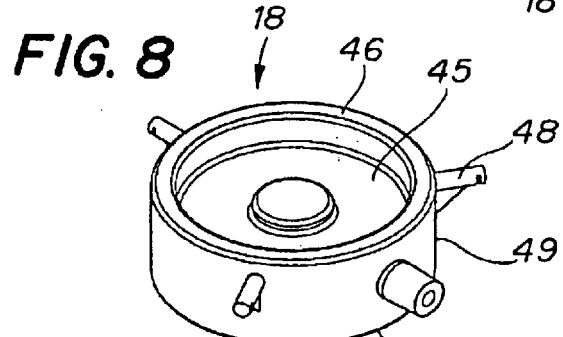
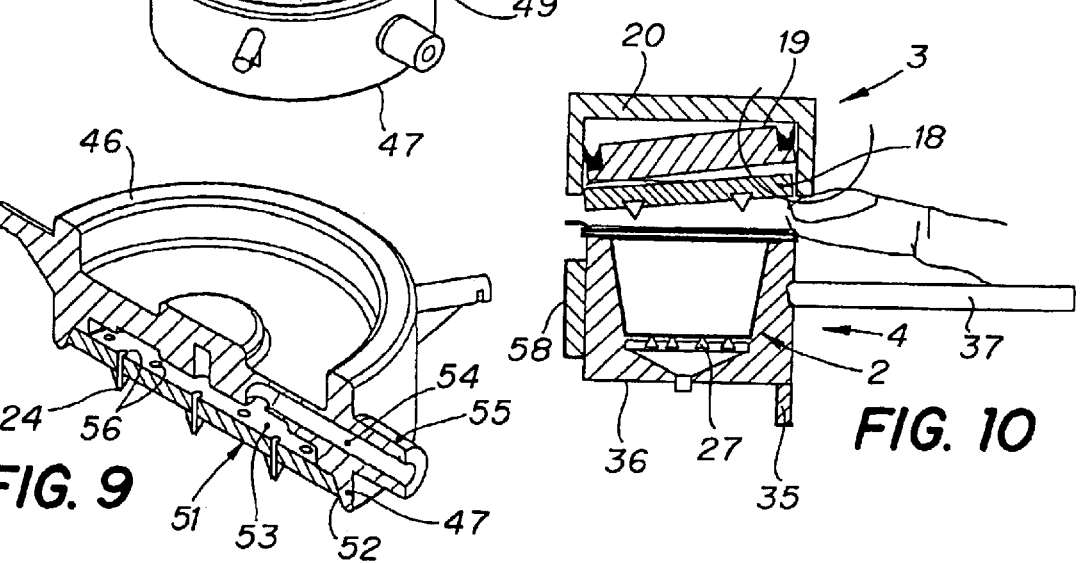

DEVICE FOR INJECTING WATER INTO AN APPARATUS FOR PREPARING A BEVERAGE FROM A CAPSULE

The present invention is concerned with a pressurized water injection device for an apparatus for preparing a beverage from a capsule containing an extractable product.

"Espresso" coffee machines are already known since a number of years, which make use of capsules containing a dose of ground coffee for the preparation of a coffee beverage.

In these apparatuses, a liquid is introduced under pressure inside the capsule mounted in a housing cavity of the apparatus by means of a capsule-holder and the coffee beverage is collected at the outlet of the capsule-holder.

These coffee machines include, generally, a pump for supplying the water, a heating system for heating the water and a device for injecting the water into the capsule.

In use, a capsule is placed into a capsule-holder provided with a handle and the capsule-holder is locked onto the coffee machine via a bayonet connection system, by imparting a rotational motion to the handle, in such a manner as to position the capsule in a housing of the machine.

During this locking operation the upper side of the capsule is perforated by a protruding injection nozzle, and the bottom of the cartridge is perforated by protruding members located on the bottom of the capsule-holder as pressure is applied.

Subsequently, water is injected under pressure into the capsule by the injection device and the coffee extracted is collected in a cup placed beneath the capsule-holder.

In this type of coffee machine, the pressure of the hot water exiting from the injection nozzle can reach 16 bars such that a perfectly water-tight seal has to be established when locking the capsule-holder to the coffee machine via the bayonet connection system, which necessitates the application of a significant force on the handle of the capsule-holder, during its tightening by rotation.

This force, exerted upon the handle, generally induces a rotation of the entire machine, so that it is necessary to hold down the coffee machine with the free hand. Furthermore, it is difficult to automate the capsule loading and ejection operations with this type of system.

Furthermore, this locking can be difficult to carry out by users who lack the strength needed or who suffer a handicap of the hand.

The present invention is aimed at remedying these drawbacks, by providing a water injecting device, which does not require locking of the capsule-holder to the coffee machine by manual rotation of the handle of the capsule-holder.

The apparatus has a water injecting device including an injection head connected to a water supply conduit, a hydraulic system for displacing the injection head towards a capsule-holder positioned beneath the injection head, the hydraulic system being connected to a piston water conduit interconnected via a locking control valve to a pump, which also feeds the injection head.

The water supply conduit is connected to the injection head and is advantageously interconnected with the pump, via a valve calibrated to operate at a certain pressure, for example in the vicinity of 4 bars.

The water supply conduit can be connected to a discharge conduit via a discharge valve, to enable a release of the pressure in the injection head at the end of the beverage extraction cycle.

The locking control valve advantageously includes a position in which the piston water conduit is connected to a return conduit for enabling the release of the pressure and the discharge of the water in the hydraulic system.

The hydraulic system can include a body and a piston provided with an annular seal, enclosing a water-tight space connected with the piston water conduit.

Advantageously, the piston and the seal have a shape and a size such that, when the piston assumes a slanted position in the body, this causes a breakdown of the water-tightness and, accordingly, a release of the pressure in the hydraulic system.

The injection head includes a plurality of perforating and injecting spikes, distributed over a lower surface, for injecting water into the capsule, in the manner of a shower head.

The injection head has the general shape of a disk with a diameter such that it may be mounted slidably into the body of the hydraulic system to abut against the piston, the radial clearance between the Injection head and the body being such that the injection head can assume a slanted position at an angle which is sufficient to cause a breakdown of the water-tightness of the piston.

The plate of the injection head can be provided with a passage extending between a connector part for connecting the supply conduit, and with a space above a plate with multiple perforating and injecting spikes, for its supply with injection water.

The injection head includes attachment means to which are attached return springs which are fastened at their other end to a support frame of the water injecting device, for returning the piston and the injection head to their standby position.

Other characteristic features, objects and advantages of the invention will become more apparent from the following description of an exemplary non limiting embodiment, illustrated in the appended drawings, wherein:

FIG. 5 is a perspective view of a water injecting device, according to the present invention;

FIG. 6 is a cross-sectional view of the water injecting device, shown in FIG. 5;

FIG. 8 is a detailed view of the dynamic shower of the water injecting device shown in FIGS. 5 to 7;

FIG. 9 is a cross-sectional view of the dynamic shower shown in FIG. 8;

FIG. 10 is a schematic view of the water injecting device and of a capsule-holder, positioned beneath the device, illustrating a safety function of the apparatus;

Figure 1:
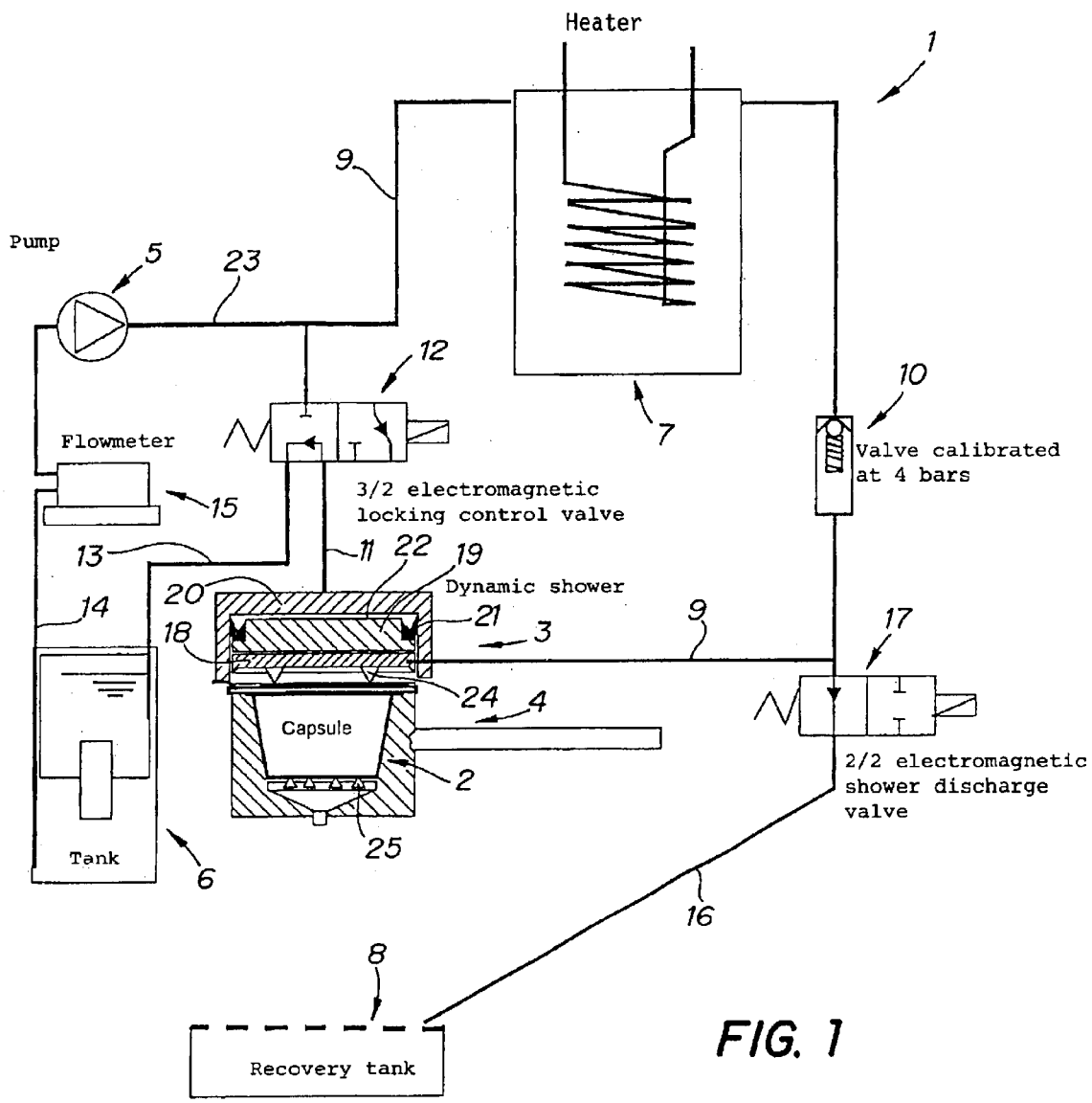
FIG. 1 is a schematic view of an apparatus according to the present invention, in its standby position.

Referring to FIG. 1, an apparatus for preparing a beverage 1 from a capsule 2 comprises a water injecting device 3, a capsule-holder 4 for housing the capsule and bringing the same beneath the water injecting device, a water supply pump 5, a source of water 6, such as a water tank, a heater 7 and a recovery tank 8, positioned beneath the water injecting device 3, of the capsule-holder 4.

The injection device 3 is interconnected via a supply conduit 9 to the pump 5. The supply conduit 9 extends through the heater 7 and a valve 10, which is calibrated to operate at a certain pressure, for example in the vicinity of 4 bars, in such a manner that the supply of the injection head 3 with injection water proceeds only when a certain pressure threshold in the supply system has been reached. The injection head 3 is, furthermore, connected to a pump 5 through a piston water conduit 11 via a locking control valve 12, for example an electromagnetic valve, which makes it possible to interconnect the piston water conduit 11 with the discharge conduit 23 of the pump 5 or, in a second position, with a return conduit 13 leading to the water tank 6. The pump 5 is interconnected with the water tank 6 by a water supply conduit 14 via a flowmeter 15, which makes it possible to adjust automatically the volume of water to be injected for the preparation of a beverage.

Downstream of the calibrated valve 10, the injection water supply conduit 9 is connected to a discharge conduit 16, which extends to the recovery tank 8. The discharge conduit 16 extends through a discharge valve 17 for the injection water, the valve 17 being, for example, an electromagnetic valve which can assume two positions, one being an open position and the other a closed position.

The water injecting device 3 includes a removable injection head 18 and a hydraulic system for displacing the injection head towards the capsule 2. In the embodiment Illustrated, the hydraulic system includes a piston 19 sliding in a body 20 of the injection device. The piston 19 is provided with a seal 21 so as to enclose sealingly a space 22 between the piston and the body for injecting water via the piston water conduit 11, to produce a displacement of the piston 19. The injection head 18 abuts against the piston 19 and is, accordingly, pushed by the piston when the same moves towards the capsule.

The operations carried out by the apparatus for preparing a beverage, will now be described with reference to FIGS. 1 to 4.

FIG. 1 illustrates the standby position, in which the locking control valve 12 is in a first position wherein the piston water conduit 11, connected to the injection device 3, is connected to the return conduit 13, so that the pressure in the space 22 of the hydraulic system equals the atmospheric pressure. The injection head 18 and the piston 19 are in an upper position, held for example by springs, of which the constructional details will be described later.

In the standby position of FIG. 1, the discharge valve of the injection device is in a first position, in which the injection water supply conduit 9 is connected to the recovery tank 8 via a conduit 16.

Figure 2:
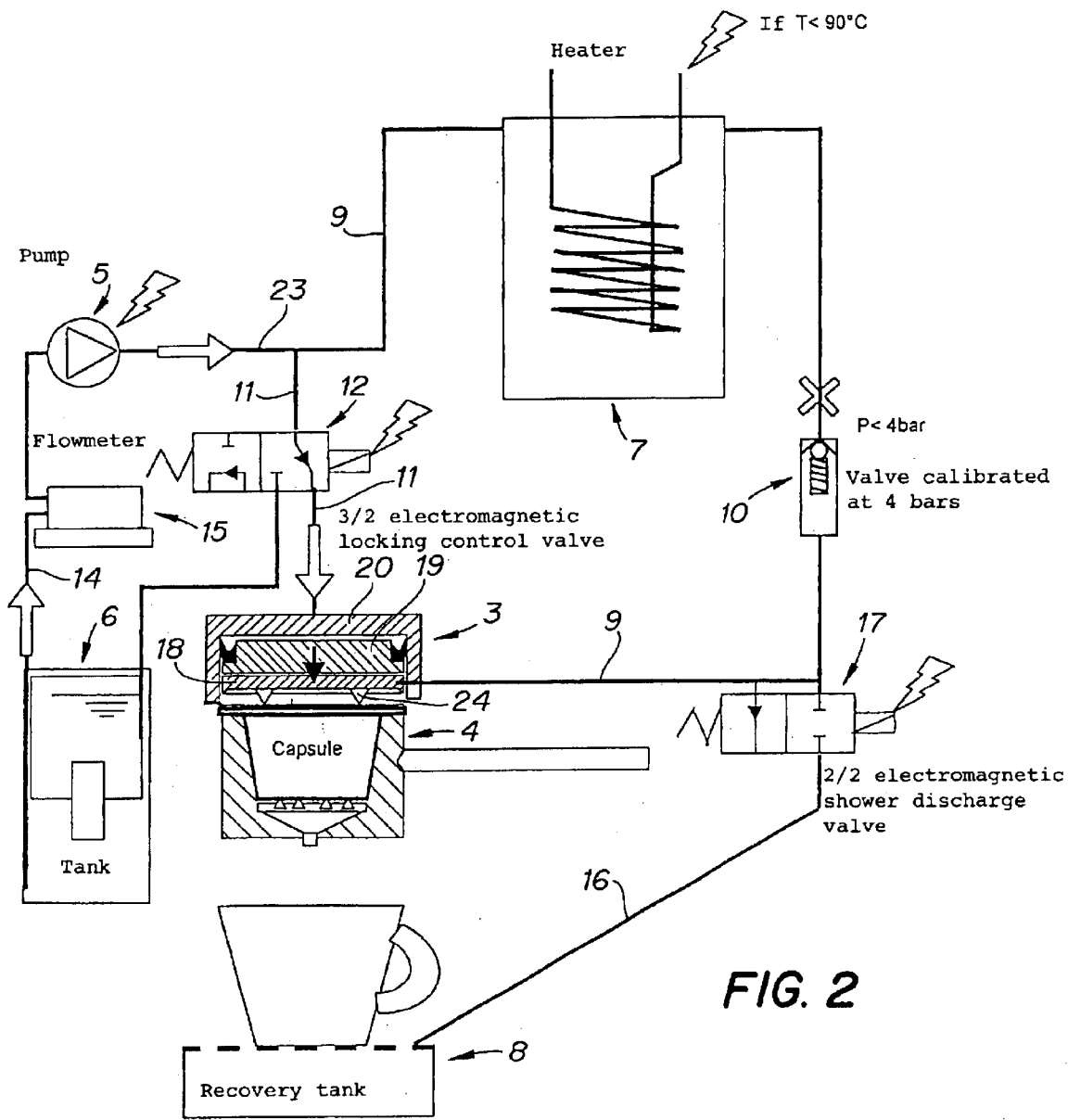
FIG. 2 is a schematic view of the apparatus at the beginning of its working cycle.

In order to initiate the beverage preparation cycle, the locking control valve is displaced towards its second position, as illustrated in FIG. 2, so that the piston water conduit 11 is connected with the discharge conduit 23 of the pump 5. Furthermore, the injection discharge valve 17 is displaced to its first position, in which the discharge conduit 16 is not connected any more with the supply conduit 9.

Figure 3:
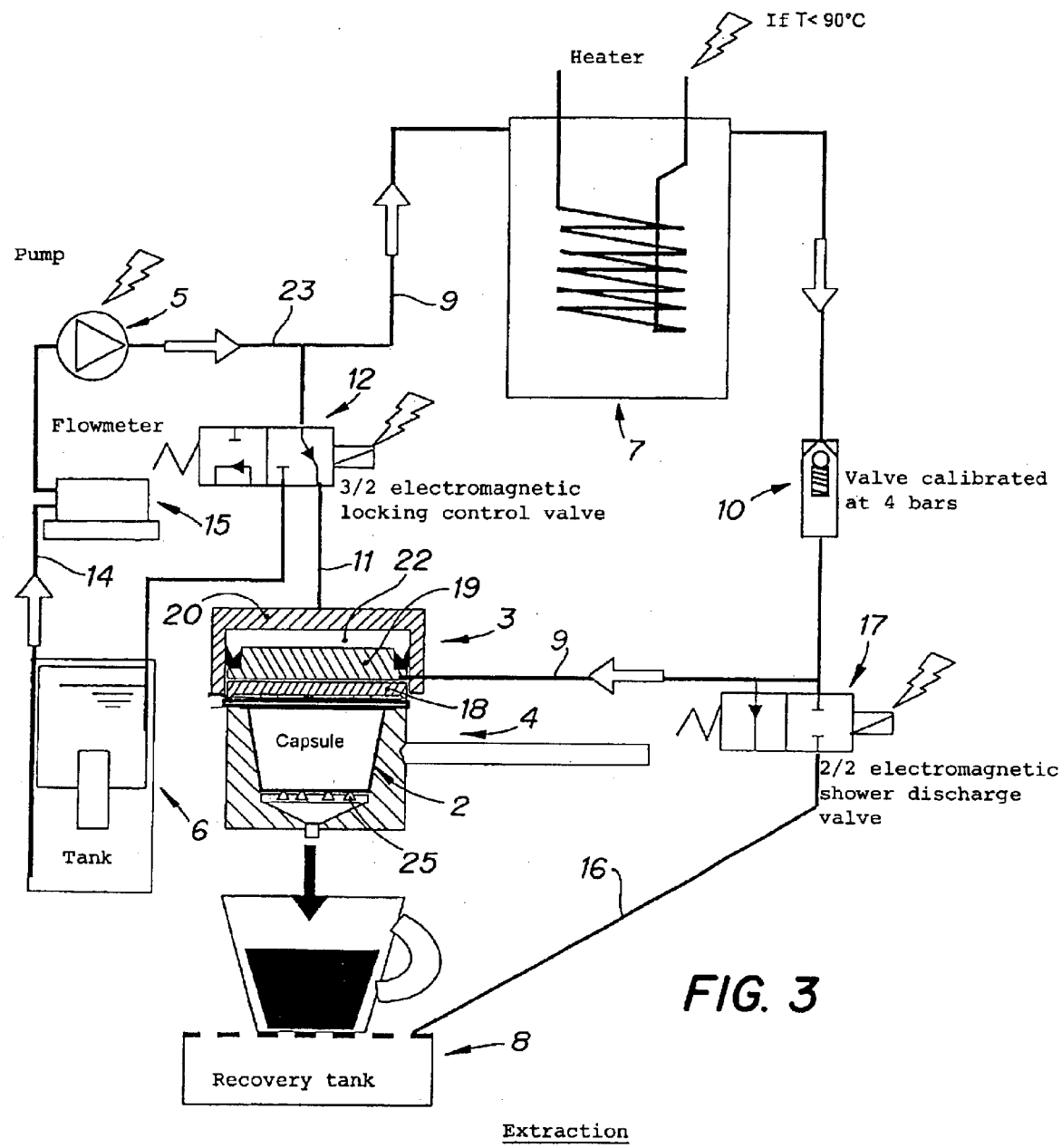
FIG. 3 is a schematic view of the apparatus during the phase when water is injected and the contents of the capsule are extracted to produce a beverage.
Figure 4:
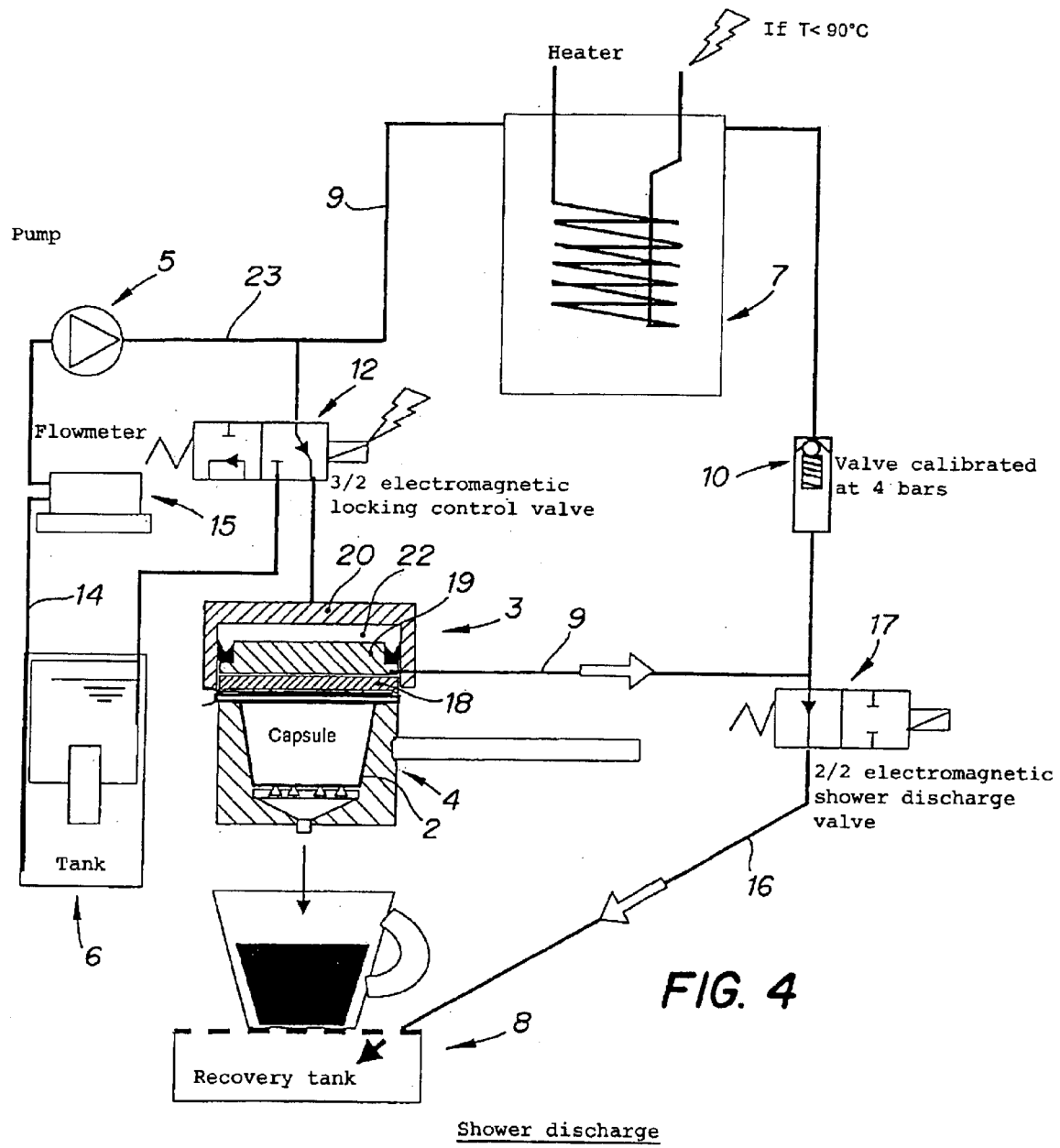
FIG. 4 is a schematic view during the phase of discharge from the injection head.

The pressure of the water supplied by the pump displaces the piston 19, as well as the injection head, towards the capsule, until the injection head abuts against the periphery of the cover of the capsule, urged against the upper rim of the capsule-holder, as illustrated in FIG. 3. In this position, the perforating and injecting spikes 24 will have perforated the cover of the capsule. The displacement of the piston and of the injection head is thus halted and this causes a pressure increase in the supply conduit 9, until the pressure threshold of the calibrated valve 10 is reached and, as a result, water is supplied to the injection head and is injected into the capsule through the orifices in the perforating and injecting spikes 24. Clearly, during this cycle, the heater functions, as needed, to heat the water to be injected.

Preferably, a multitude of perforating and injecting spikes 24 are distributed over the surface of the injection head, in such a manner that the water is injected under pressure in the form of a shower and is distributed over the upper surface of the capsule, to wet thoroughly the coffee or some other substance used for preparing beverages, such as tea or broth, before being discharged via the perforations provided in the bottom of the capsule. The bottom of the cartridge-holder is provided with perforating and extracting spikes 25 for perforating the capsule when a certain pressure is reached. During the injection cycle, the pressure is maintained on the piston 19 in order to ensure the water-tightness of the injection head abutting against the upper rim of the capsule-holder, and to ensure that the inside of the capsule-holder remains water-tight during the injection of water and of steam.

Owing to the calibrated valve, the pressure with which the injection head is applied against the capsule-holder is a well-defined minimal pressure, capable of guaranteeing a proper water-tightness.

Furthermore, due to the fact that there is only one pump simultaneously supplying water to the piston and the water injected Into the capsule, the pressure on the piston is, in all cases, higher than the pressure in the capsule, and this guarantees that the system remains water-tight independently of the pressure variations, i. e. that the force with which the injection head is urged against the capsule-holder is always higher than the force produced by the pressure in the capsule on the injection head.

Furthermore, the system is uncomplicated and requires no pump or other means for generating additional pressure for displacing the injection head.

Once the desired amount of liquid, controlled by a flowmeter, has been supplied for the preparation of the beverage, the supply pump 5 is stopped and the discharge valve 17 of the injection head is moved to its first position, with the result that the pressure in the capsule 2 and in the injection head 18 is released, and the residual hot water can be returned via the discharge valve to flow into the recovery tank 8.

Immediately after the discharge operation from the injection head, the locking control valve 12 is moved into its first position, to enable a return of the water in the piston space 22, to the water tank 6.

An advantage of this system is that the water used for the displacement of the piston is cold water, so that there is no return of hot water into the tank, which would have the drawback of facilitating the proliferation of bacteria. This last step ends in the standby position, as illustrated in FIG. 1.

Figure 7:
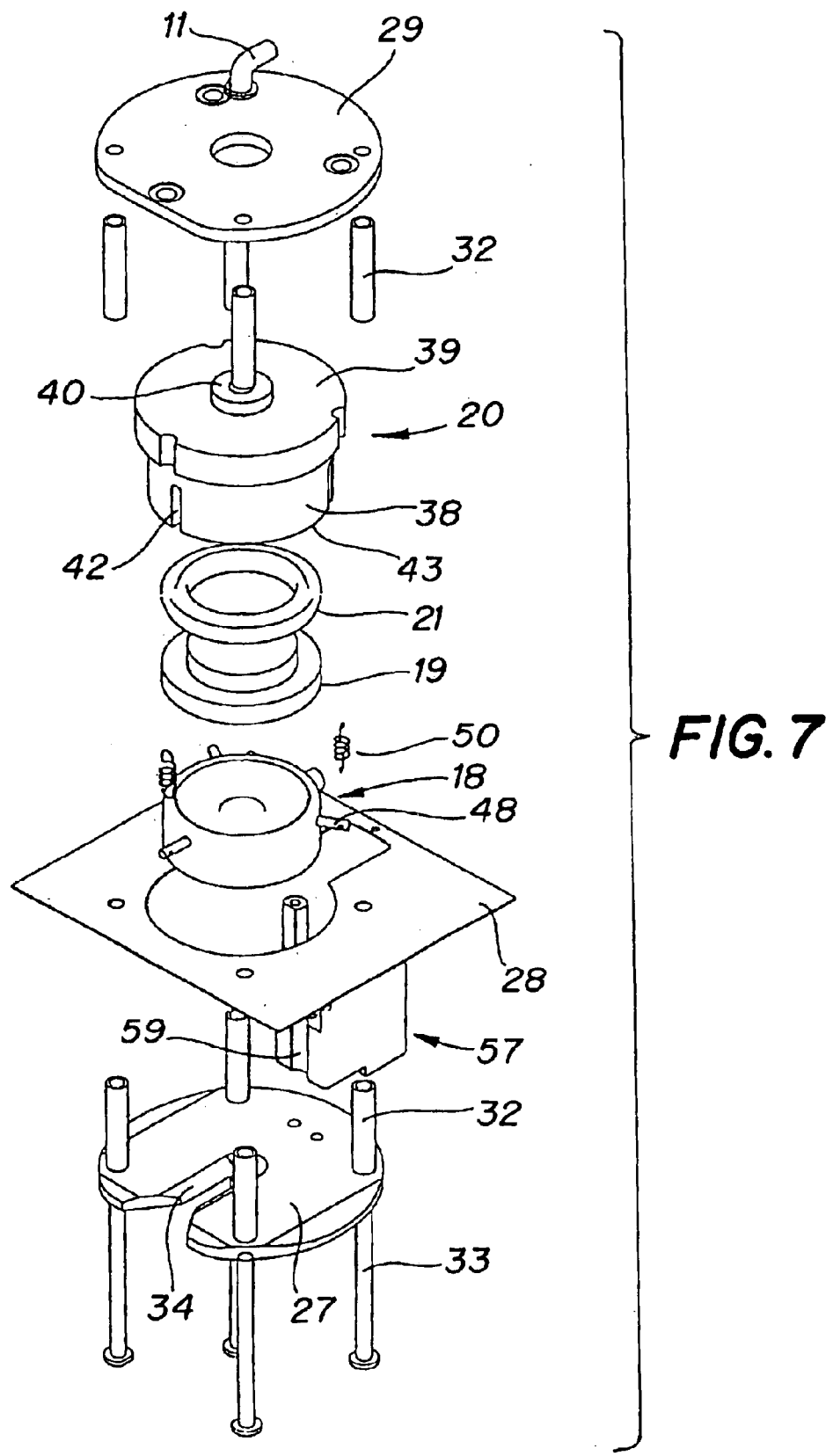
FIG. 7 is an exploded view of the water injecting device, shown in FIG. 1.

With reference to FIGS. 5, 6 and 7, the water injecting device 3 includes: a support frame comprised of a base plate 27, of an intermediate wall 28 which can be part, for instance, of the apparatus casing and of an upper plate 29, the plates and the wall being fastened together, while being held spaced apart from each other, by spacer and fastener means 31, for example provided as pillars 32 affixed to the plates via bolts and nuts 33; a hydraulic system 30 fixed beneath the upper plate 29; and the injection head 18.

The lower plate 27 includes a guiding means 34 provided as a slot extending from its edge towards its centre and provided for facilitating the proper orientation and positioning of a capsule-holder under the injection head 18. The capsule-holder includes an additional guiding means, provided, for instance, as a protrusion 35 under the lower face 36 on the side close to the handle 37 (see FIG. 10).

The hydraulic system includes the body 20 housing slidably in its recessed lower part the piston 19 and the injection head 18.

The body 20 includes a cylindrical part 38, which is recessed and a lid part 39, this lid part including a means 40 for connecting the same to the piston water conduit 19. In this example, the connector means includes a protruding part, located in a bore, extending through the upper plate and provided with an orifice 41, in such a manner as to create a passage for the injection of the piston water into the water-tight space formed by the body 20 and the piston 19.

The cylindrical part 39 of the body 20 has three elongated slots 42, which are arranged symmetrically and which extend from its lower free rim 43 over a certain distance in the direction of the lid part 39.

The piston 19 includes a thick plate having the shape of a disk and an annular seal 21 having substantially a V-shaped cross-section. The seal is nested in a step-shaped groove 44 on the upper periphery of the plate.

The seal 21 ensures a water-tight contact between the lower wall of the cylindrical part of the body 20 and the piston 19, as long as the piston is not in its slanted position. However, the water-tightness breaks down when the piston assumes a slanted position at a certain angle relative to its normal operating position, as is illustrated in FIG. 10. This aspect of the invention offers the advantage of improving the safety of the apparatus, since an object which would be stuck between the upper rim of the capsule-holder 4 and the injection head 18 would cause the piston to assume a slanted position, which would result in a breakdown of the water-tightness and, accordingly, a release of the pressure in the hydraulic system, so that the downward urging force of the piston would be very small.

The injection head 18, illustrated in detail in FIGS. 8 and 9, comprises a plate 45 having the shape of a disk and including an upper annular rim 46 protruding upwards and a lower annular rim 47 protruding downwards. The diameter of the plate 45, as compared with the diameter of the recessed cylindrical plate 38 of the body 20 is selected so as to ensure a sufficient clearance to allow the injection head and, accordingly, the piston 19 to assume a position with a slant sufficient, taking into account the characteristics of the seal, to cause a breakdown of the water-tightness.

The injection head 18 includes, furthermore, three rods 48, extending in a radial direction with respect to the cylindrical outer surface 49 of the plate, each one of these rods having a position and a size such that they may extend through a respective slot 42 of the body 20, after the insertion of the injection head into the recessed cylindrical part of the body. These rods act as attachment means for return springs 50 fixed at their other end to the upper plate, for ensuring the return of the piston 19 into its upper position after a discharge cycle of the shower and in the standby position of the apparatus. A shower plate 51 with multiple spikes is placed sealingly against the lower surface 52 of the lower rim 47 so as to form a space for the distribution of the injection water 53 between the shower plate and the central part of the plate 45 of the injection head. The plate 45 of the injection head has a passage 54 provided with a connector 55 for connection with the supply conduit 9 of the apparatus, with the passage 54 opening into the space 53 for injecting water. The water supplied into the space 53 is injected into the capsule via orifices 56 extending through the perforating spikes 24.

The water injecting device is also provided with a presence sensor 57, capable of detecting the presence or otherwise of the capsule-holder 4 in its proper position underneath the injection head. For reasons of safety, the actuation of the cycle of injecting water and of recovering the extracted beverage is prevented, as long as the capsule-holder is not in a well-defined position with respect to the sensor 57, i. e. until the same is properly positioned underneath the Injection head.

To ensure that the system is reliable and does not detect an object other than a capsule-holder, the capsule-holder Is provided with a magnet 58, which is arranged on the side away from the handle 37 and which is inserted into a matching notch 59 of the presence sensor 57, in the working position. The presence sensor 57 is, in this example, a magnetic field sensor. Other non-magnetic objects or objects not having the proper shape are not detected by the sensor 57 and this guarantees a high level of safety.

The apparatus according to the invention could easily be adapted to load and eject automatically the capsules, through the use of mechanisms, which are relatively simple, since it is not necessary to provide a mechanism which locks the capsule-holder tightly to the injection device, but one which simply places the capsule-holder beneath the injection device. In the case of the manually operated loading system for the capsule-holder illustrated in the figures, the simplicity of the positioning of the capsule-holder beneath the injection head makes it possible to construct the capsule-holder from materials which are light and inexpensive, such as plastic materials. This also offers the possibility of providing a plurality of capsule-holders, one for each different beverage, in order not to alter the taste of one beverage by the taste of another beverage.

The apparatus, according to the invention, also offers the advantage of having a hydraulic system which is simple and which requires only one pump.

What is claimed is:

1. An apparatus for preparing a beverage from a capsule containing the product to be extracted, the apparatus having a water injecting device (3) including an injection head (18) connected to a water supply conduit (9) and a hydraulic system for displacing the injection head towards a capsule-holder (4) positioned beneath the injection head, the hydraulic system being connected to a piston water conduit (11) interconnected to a pump (5), which also feeds the injection head, characterised in that the water injecting device (3) includes a body (20) and a piston (19) provided with an annular seal enclosing water-tightly a space (22), the piston (19) and the seal (21) having a shape and a size such that the piston may assume a slanted position in the body (20), to cause a breakdown of the water-tightness and a loss of pressure in the hydraulic system.

2. An apparatus according to claim 1, characterised in that the water supply conduit, which is connected to the injection head (18), is interconnected with the pump (5), via a valve (10), calibrated to operate at a certain pressure.

3. An apparatus according to claim 2, characterised in that the valve (10) is calibrated to operate at a pressure in the vicinity of 4 bars.

4. An apparatus according to one of the preceding claims, characterised in that the water supply conduit (9) is connected to a discharge conduit (16) via a discharge valve (17), to enable a release of the pressure in the injection head at the end of the beverage extraction cycle.

5. An apparatus according to one of the preceding claims, characterised in that a locking control valve (12), arranged between the hydraulic system and the pump, includes a position in which the piston water conduit (11) is connected to a return conduit (13) for enabling a loss of pressure and discharge of water in the hydraulic system.

6. An apparatus according to one of the preceding claims, characterised in that the injection head (18) includes a plurality of perforating and injecting spikes distributed over a lower surface, for injecting water into the capsule, in the manner of a shower head.

7. An apparatus according to one of the preceding claims, characterised in that the injection head has the general shape of a disk with a diameter such that it can be mounted slidably in the body (20) of the hydraulic system, to abut against the piston (19).

8. An apparatus according to one of the preceding claims, characterised in that the radial clearance between the injection head (18) and the body (20) is such that the injection head can assume a slanted position, at an angle which is sufficient to cause a breakdown of the water-tightness of the piston (19) abutting against the injection head.

9. An apparatus according to one of the three preceding claims, characterised in that the plate of the injection head is provided with a passage (54) extending between a connector part (55) for connecting the supply conduit (9) and with a space (53) above a plate (51) provided with multiple perforating and injecting spikes (24).

10. An apparatus according to one of the preceding claims, characterised in that the injection head (18) includes attachment means (47) to which are attached return springs, which are fastened at their other end to a support frame of the water injecting device, for returning the piston (19) and the injection head (18) to their standby position.

* * * * *